United States Patent [19]

Jacobson

[11] Patent Number: 4,529,022
[45] Date of Patent: Jul. 16, 1985

[54] CUTTING TOOL

[76] Inventor: Delbert G. Jacobson, 1112 S. Batavia Ave., Batavia, Ill. 60510

[21] Appl. No.: 400,697

[22] Filed: Jul. 22, 1982

Related U.S. Application Data

[63] Continuation-in-part of Ser. No. 259,994, May 4, 1981, abandoned, which is a continuation-in-part of Ser. No. 99,729, Dec. 3, 1979, abandoned.

[51] Int. Cl.³ .................. B27G 15/00; B23B 41/06
[52] U.S. Cl. .................................... 82/1.5; 408/159
[58] Field of Search ............... 145/124; 144/218; 408/159, 168, 180, 129; 82/1.2, 1.5

[56] References Cited

U.S. PATENT DOCUMENTS

| 858,752 | 7/1907 | Potter | 408/159 |
|---|---|---|---|
| 2,236,944 | 4/1941 | Gerardi | 408/159 |
| 2,325,020 | 7/1943 | Shaw | 145/124 |
| 2,520,639 | 8/1950 | Johnson | 82/1.2 |
| 3,358,722 | 12/1967 | Berry | 145/124 |
| 4,307,636 | 12/1981 | Lacey | 82/1.5 |
| 4,347,768 | 9/1982 | Boehm | 82/1.5 |

Primary Examiner—W. D. Bray
Attorney, Agent, or Firm—Leo J. Aubel; Ralph R. Rath

[57] ABSTRACT

A cutting tool for forming a tapered bore in a workpiece includes a pair of cutting blades pivotally supported in a slot at one end of a member and pivoted by an axially movable expander. In one embodiment, the member also has a drill bit configuration on the end of the member with the slot to initially produce the bore.

7 Claims, 18 Drawing Figures

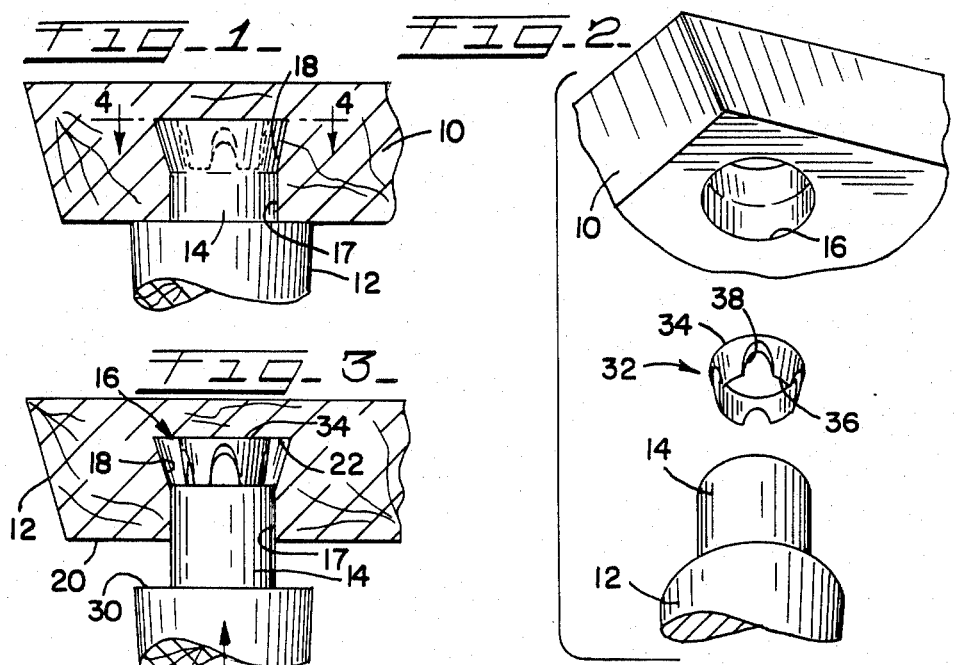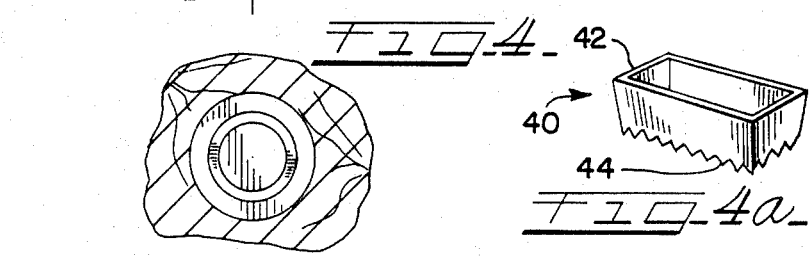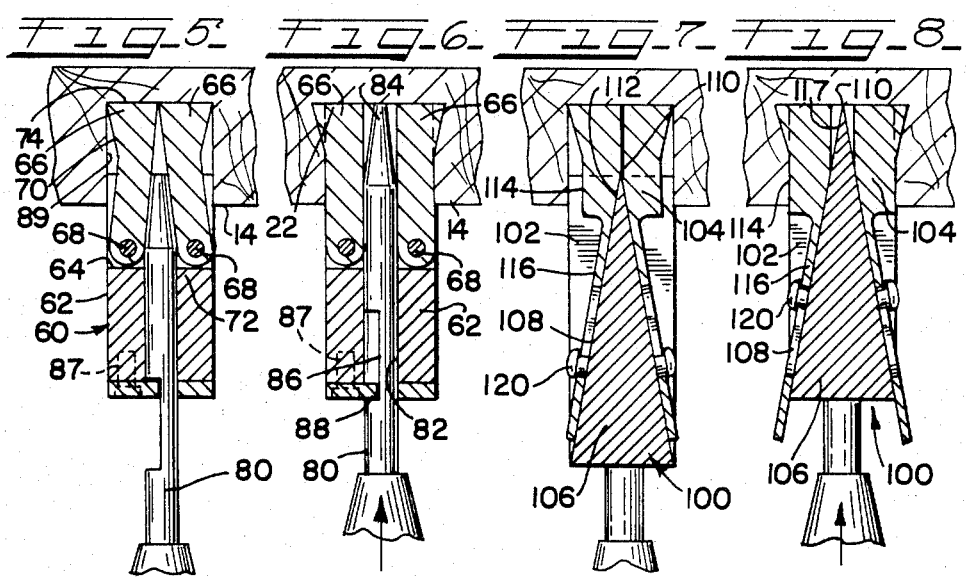

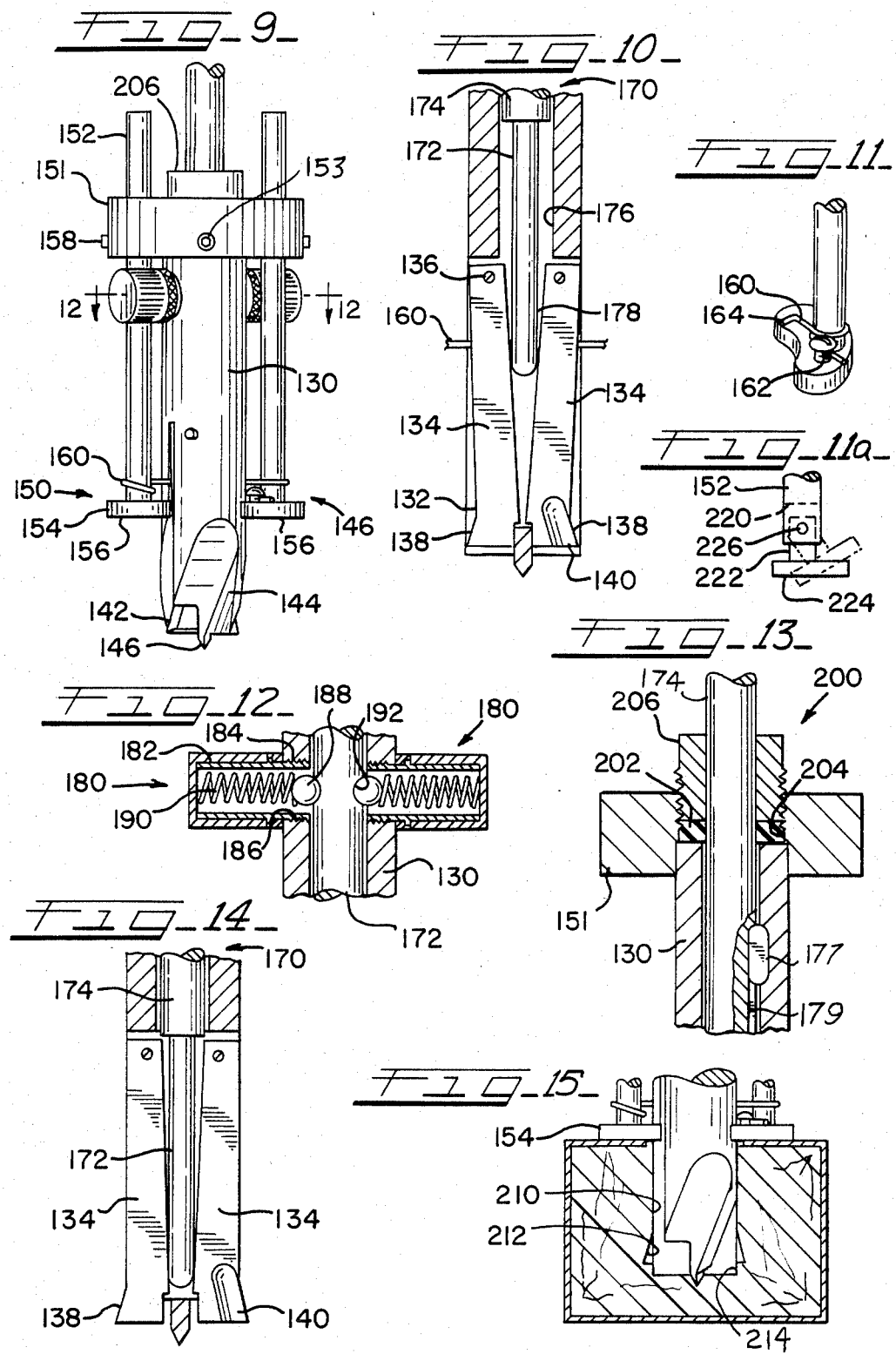

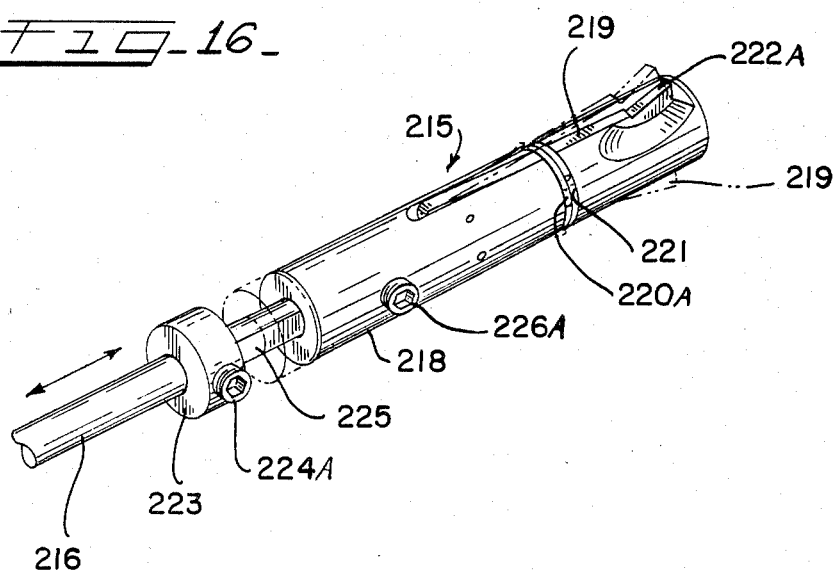

4,529,022

CUTTING TOOL

REFERENCE TO RELATED APPLICATION

This application is a Continuation-In-Part application of U.S. Ser. No. 259,994, filed May 4, 1981 (now abandoned), which is a Continuation-In-Part application of U.S. Ser. No. 99,729, filed Dec. 3, 1979 (now abandoned).

TECHNICAL FIELD

The present invention relates generally to fasteners of the type used to join two elements of manufacture, such as elements of furniture or similar structures. More specifically, the present invention relates to a novel cutting tool for producing a circular bore having an outwardly tapered base.

BACKGROUND OF THE INVENTION

The use of dowel pins for joining two wooden members has been in existance for more than a century and consists of a circular wooden dowel pin or similar structure that is inserted within two dowel holes formed in the respective members.

Examples of various types of dowel constructions and manners of assemblying two pieces of wood are disclosed in U.S. Pat. Nos. 148,276; 1,555,242; 1,726,362; 2,011,529; 2,384,918; 3,883,258; 3,927,467; 3,966,339; 3,954,345; and, 4,028,999.

In the aforementioned patents, various types of dowel pin constructions and methods of assembling are disclosed and all of these contemplate the interconnection of two wooden members without the use of glue or nails.

SUMMARY OF THE INVENTION

According to the present invention, a unique cutting tool has been developed which can easily produce a tapered bore with relatively inexpensive tooling.

The cutting tool of the present invention is utilized for producing the bore that has an enlarging taper at its base consists of a member that has a circular cross-section substantially equal to the minimum diameter of the tapered bore and the member has a slot extending radially from a peripheral surface on one end thereof. A cutting element is supported within the slot and the cutting element has a tapered outer cutting element radially of the slot to expose the tapered cutting edge beyond the periphery of the slot. In one specific embodiment of the cutting tool, the cutting tool has its slot extending diametrically across one end of the member with first and second cutting elements each having a tapered cutting edge pivotally supported in the opposite radial ends of the slots and a tapered pin is reciprocable along the axis of the member and has a tapered end engaging the inner edges of the cutting elements so that the cutting elements are pivoted outwardly by axial movement on the pin.

In another embodiment of the invention, the cutting tool again has a slot that extends diametrically across the member at one end thereof with a tapered wedge located within the slot defining inclined surfaces. Two cutting elements have surfaces respectively in sliding contact with the inclined surfaces so that radial movement of the cutting elements is produced by relative sliding movement of the surfaces while the cutting elements are moved axially along the inclined surfaces to move the cutting edges radially of the slot.

In a further embodiment, the cutting tool has drill bit configuration on the end of the member which has the slot and has an abutment spaced from this end so that the member initially produces a bore of a predetermined depth and then the cutting elements produce the taper at the base of the bore. In this embodiment, the pin has a rounded end which is used to expand the cutting elements and releaseable retention means are located between the member and the pin to retain the pin in a first position while the bore is being formed. The tool also has friction-producing means between the member and the pin to control the force required to move the pin.

BRIEF DESCRIPTION OF SEVERAL VIEWS OF DRAWINGS

FIG. 1 is a fragmentary cross-sectional view of two pieces of wood that have been joined in accordance with the present invention;

FIG. 2 is an exploded view of the components before being assembled;

FIG. 3 is a view similar to FIG. 1 showing the components being assembled;

FIG. 4 is a cross-sectional view as viewed along line 4—4 of FIG. 1;

FIG. 4a is a modified form of expansion element;

FIG. 5 is a cross-sectional view of a cutting tool utilized in forming the opening in one of the members;

FIG. 6 is a view similar to FIG. 5 showing the cutting tool in a second position;

FIG. 7 is a modified version of the cutting tool for forming an opening;

FIG. 8 is a view similar to FIG. 7 showing the cutting elements in a second position;

FIG. 9 shows a further modified form of the cutting tool;

FIG. 10 is a fragmentary cross-sectional view of the tool shown in FIG. 9.

FIGS. 11 and 11A show fragmentary perspective views of an abutment and a modification thereof of the tool shown in FIG. 9;

FIG. 12 is a cross-sectional view as viewed along line 12—12 of FIG. 9;

FIG. 13 is a fragmentary cross-sectional view of the upper end of the tool;

FIG. 14 is a view similar to FIG. 10 showing the cutting elements in an expanded condition;

FIG. 15 is a cross-sectional view of a workpiece with the cutting elements having just completed the tapered bore; and FIG. 16 is an isometric view showing a modified version of the inventive cutting tool.

BRIEF DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

The cutting tool of the present invention is particularly adapted for forming a bore used for interconnecting two members or pieces of wood 10 and 12. By way of example and not of limitation, the first piece 10 could be the seat for a chair while the second piece 12 could be a leg for the chair. As shown in FIG. 2, member or piece 12 has a circular portion or dowel 14 at one end thereof while the first piece or member 10 has a circular opening 16 extending from one surface thereof.

As illustrated in FIG. 3, the bore 16 has a circular portion 17 extending from surface 20 and terminating intermediate opposite ends of bore 16 and has an enlarging taper 18 extending from circular portion 17 which tapers to a flat base 22 that extends generally parallel to the surface 20. The tapered portion 18 of bore 16 has a minimum diameter spaced a certain distance from surface 20.

Dowel 14 has a diameter substantially equal to the minimum diameter of bore 16 and has an axial length measured from surface 20 which is substantially equal to the axial length of bore 16.

An inexpensive expansion element is utilized for expanding the dowel 14 into extended engagement with the peripheral surface of tapered bore 16. As illustrated in FIG. 2, frusto-conical element 32 is tapered between opposite ends 34 and 36 and the taper corresponds substantially to taper portion 17 of bore 16, as is more clearly illustrated in FIG. 3. The reduced or minimum diameter end 36 of expansion element 32 has a sharp edge defined thereon by reducing the wall thickness of the frusto-conical member from the larger outside diameter end 34 to the smaller outside diameter end 36. To further enhance the penetration capability of the frusto-conical element or member 32, the body or wall also has circumferentially spaced recesses 38 extending from the reduced diameter end 36 so that the sharp cutting edge is defined by circumferentially spaced projections. The end or edge 38 could also be pointed without serrations.

As illustrated in FIG. 2, the flat blunt end 34 of element 32 defines a plane which extends perpendicular to the axis for the frusto-conical element 32 and is supported on base 22, for a purpose that will be described later.

The axial length of frusto-conical element 32 is substantially less than the depth of the tapered bore so that the sharp cutting edge is spaced from surface 20 when the elements are in the position illustrated in FIG. 3. It will also be noted that the diameter of the reduced end or sharp edge 36 is less than the diameter of the dowel 14 and the diameter of the enlarged blunt end 34 is also slightly smaller than the minimum diameter of opening 16.

In assembling the components or members 10 and 12, the expansion element 32 may be initially placed on the end surface of dowel 14 and is forced in slightly so that the sharp cutting edge penetrates the end wall sufficiently to maintain the expansion element 32 on the end of dowel 14. The dowel 14 with expansion element 32 supported thereon is then inserted into the circular portion 17 of bore 16 which will guide the dowel to the center of tapered portion 18 and will not be tilted with respect to the axis of the bore. A force is then applied to the dowel and will cause the expansion element to penetrate into the dowel 14 and will expand the free end portion of the dowel sufficiently to cause the dowel pin to conform to the shape of the tapered bore and produce extended engagement between the peripheral surface of dowel pin 14 and the surface of bore 16.

In its assembled condition, illustrated in FIG. 1, the dowel pin 14 has been expanded into engagement with the periphery of bore 16 by having the enlarged blunt end forced into the end of dowel pin 14. This will cause a controlled splitting of the periphery of the dowel pin 14 to produce the extended engagement between the adjacent surfaces so that the diameter of the dowel is slightly larger than bore 16.

In the embodiment illustrated in FIGS. 1–4, the bore 16 and dowel 14 have been illustrated as being circular. However, other configurations may be used. FIG. 4a shows a rectangular rivet or expansion element 40 which has an enlarged blunt end 42 and a reduced serrated sharp edge 44 with the rivet being tapered between the blunt end 42 and sharp edge 44 at the opposite end. Rivet 40 is designed to be used with a rectangular dowel inserted into a rectangular tapered bore (not shown).

According to the primary aspect of the present invention, a unique cutting tool is utilized for producing the tapered bore 16, and a first embodiment of the invention is disclosed in FIGS. 5 and 6. As illustrated in FIGS. 5 and 6, the cutting tool consists of a member 60 that has a substantially circular peripheral surface 62. A slot 64 extends diametrically across the lower or inner end of circular member 60 and terminates intermediate opposite ends. First and second cutting elements 66 which are identical in construction are pivotally supported within slot 64 by a pair of pins 68 extending across the inner end of slot 64. Each cutting element 66 has an outer tapered cutting edge 70 and a generally flat inner edge 72. The outer free end 74 of each cutting element has a diametric dimension which is slightly less than half the diameter of circular member 60 so that the outer cutting edges are located within the periphery 62 of member 60 when in the retracted position.

The cutting tool also includes means for moving the cutting elements radially of the slot 64. In the embodiment illustrated in FIGS. 5 and 6, the means for moving the cutting elements consists of a circular shaft or pin 80 that is reciprocated in a circular opening 82 and has a tapered end portion 84 that is located adjacent the inner edges 72 of the cutting elements 66. Pin 80 has a reduced portion 86 which cooperates with a projection 88 releaseably secured to the end of member 60 by a screw 87 to define first and second positions for the reciprocal pin or moving means, respectively illustrated in FIGS. 5 and 6.

Thus, the method of forming tapered bore 16 consists of initially forming a circular opening 89 from surface 14 of member 10 utilizing a conventional drilling bit of the proper diameter. The cutting tool 60 is then inserted into the circular bore with the cutting elements in the first retracted position illustrated in FIG. 5 wherein the outer cutting edges 70 are located within the peripheral confines of member 60 and the pin 80 is in its first position. The entire member and pin 80 are then rotated with a drill (not shown) and at the same time an axial force is applied to reciprocable pin 80 so that the cutting elements are pivoted from the first position illustrated in FIG. 5 to the second position illustrated in FIG. 6. During such movement, the lower portion of circular bore shown in FIG. 5 is transformed to a circular tapered bore shown in FIG. 6 having a minimum diameter intermediate opposite ends and a maximum diameter at the base 22.

A slightly modified form of cutting tool is illustrated in FIGS. 7 and 8 and again consists of a substantially circular member 100 that has a slot 102 extending across one end thereof. First and second cutting elements 102 of identical construction are supported for movement within the slot. In this embodiment of the cutting tool, a wedge 106 having opposed inclined tapered surfaces 108 is located within slot 102 and terminates at a point 110 aligned with the inner end 112 of member 100.

Each cutting element 104 again has a tapered outer cutting edge 114 and has a support portion 116 integral therewith which has a surface in engagement with a surface 108 of tapered wedge 106. Means in the form of screws 120 received in elongated slots 122 in each support portion 116 retain the cutting elements within the slot 102.

In forming the tapered bore 16 utilizing the cutting tool 100, the cutting elements are initially in an extended position wherein the diametric dimension of the two elements at the lower free end thereof is slightly less than the diameter of member 100 and the ends of cutting elements 104 extend beyond the end 112 of member 100. In this position, the cutting elements and the outer end of the member may be inserted into the circular bore illustrated in FIG. 7 and an axial force applied to the end of the member 100 during rotational movement of the member will cause the two cutting elements to slide along the tapered surfaces 108 from the position illustrated in FIG. 7 to that illustrated in FIG. 8. Thus, the radial movement is produced as a result of a generally axial movement of the cutting elements along the inclined surface 108.

A slightly further modified form of the cutting tool is disclosed in FIGS. 9–15. In the embodiment illustrated therein, an elongated member 130 has a slot 132 extending diametrically across the lower end portion thereof. A pair of cutting blades 134 are respectively pivotally supported at their upper ends by pins 136 within slot 134. The lower ends of the cutting elements 134 have outwardly tapered cutting edges 138. Each cutting element may also have a recess 140 in one surface of the cutting element to more sharply define the cutting edge 138.

According to one aspect of the embodiment illustrated in FIGS. 9–15, the lower end of member 130 also has a cutting edge or a drill bit configuration 142 having several cutting edges 144 and a pilot point 146, for a purpose to be described later.

The cutting tool illustrated in FIG. 9 also includes a pair of abutment means 150 which are located diametrically opposite each other outside of the member 130. The abutment means 150 are supported on an enlarged portion 151 positioned adjacent the upper end of elongated member 130 and releaseably retained thereon by set screws 153. Enlarged member 151 has a pair of diametrically opposed openings which respectively receive rods 152, the lower ends of which have feet 154 defining an abutment surface 156. Rods 152 are movable axially within the openings in member 151 and are releaseably retained in adjusted positions by set screws 158. Thus, the position of abutment surfaces 156 can readily be changed by loosening set screws 158 and moving the rods vertically or axially with respect to circular member 130.

The rods 152 also act as support means for biasing means that bias the respective cutting elements inwardly to the position illustrated in FIG. 10. As illustrated in FIGS. 9 and 11, a spring 160 is telescoped around each of the rods 152 and an inner end of the spring is in engagement with a screw 162. The outer end 164 of spring 160 is positioned to be in alignment with slot 130 and engages the outer edge of cutting element 134. Thus, spring 160 acts as a biasing means for biasing the cutting element into the slot.

The cutting elements are moved from an inwardly biased position, illustrated in FIG. 10, to an outwardly biased position, illustrated in FIG. 14, through a moving means, generally designated by reference numeral 170. Moving means consists of an elongated pin 172 which has an enlarged portion 174 reciprocable within an opening 176 axially aligned with the center of circular member 130. The lower end of pin 172 has a rounded end portion 178 which is adapted to engage the inner edges of the cutting elements 134. Thus, axial movement downwardly from the position illustrated in FIG. 10 to that illustrated in FIG. 14 will cause the cutting edges 138 of cutting elements 134 to move outwardly and produce the enlarging taper adjacent the base of the bore. Enlarged portion 174 and member 130 are interconnected by a key 177 carried by member 130 and slideable in a keyway 179 formed in enlarged portion 174 (FIG. 13).

The cutting tool also has adjustable retention means for releaseably retaining the pin in a first position (FIG. 10) with respect to member 130. The adjustable retention means is generally designated by reference numeral 180 and is shown in detail in FIG. 12. Retention means 180 includes a generally cup-shaped member 182 that has an external threaded portion 184 received into a threaded opening 186 in member 130. A ball 188 is biased by a spring 190 within cup 182 towards a detent recess 192 located in a surface of pin 172. Thus, radial movement inwardly and outwardly of cup 182 will vary the spring force on ball 188 and will vary the pressure required to move ball 188 out of recess or detent 192. As shown in FIG. 12, two such retention members 180 are used and are located diametrically opposite each other so that the entire device is symetrical and equal in weight, as will be described later.

The cutting tool also includes a friction-producing means 200, illustrated in FIG. 13. The friction-producing means is in the form of a compressible resilient washer 202 that is received in an annular opening 204 in member 151. The annular opening 204 has an integral thread formed therein and an externally threaded nut 206 is received therein so that rotation of the nut will compress the resilient washer and produce an increasing friction on the peripheral surface of enlarged portion 174.

Summarizing the embodiment shown in FIGS. 9–15, the upper end of pin 172 is attached to a conventional drill and the drill bit 142 on the lower end of member 130 is utilized for producing a circular bore 210, as illustrated in FIG. 15. The depth of the circular bore is defined by the position of the abutments or feet 154. During the initial formation of the circular bore 210, cutting elements 134 remain within the peripheral confines of member 130 and pin 172 and member 130 are rotated as a unit with the pin being retained in the first position by the retention balls 188 in recesses 192. When the feet engage the surface of the workpiece illustrated in FIG. 15, additional axial force on the cutting tool will cause the pin to force the balls out of the retention recesses 192 and will cause the pin to move axially with respect to stationary member 130 and force the cutting edges outwardly to produce the enlarging taper 212 adjacent the base of bore 210. The bore also has a circular portion 214 below tapered portion 212. This circular portion may be used to center the expansion element in bore 210. The amount of force required to physically move the pin axially can be adjusted by the friction-producing means 200 and the initial force required to produce initial movement of the pin can be varied by adjusting cups 182.

The two diametrically opposed abutment members 150 and diametrically opposed retention means 180, which are off-set 90° from each other, will result in a uniformly-weighted member that can easily be rotated without producing any vibration effects on the cutting tool.

A slightly modified abutment means is illustrated in FIG. 11a wherein rod 152 has a slot 220 extending from the lower end thereof. A foot 222 is received into the slot and has an enlarged portion having a flat abutment surface 224 at the lower end thereof. The foot 222 is retained in position by a screw 226 which can be used to force the foot towards the opposite wall of slot 220 and securely grip the foot 222 in any angular adjustment position with respect to the axis of the rod. This allows the operator to drill bores at angles other than perpendicular with respect to the surface of the workpiece.

Another embodiment of the inventive cutting tool labeled 215 is shown in FIG. 16 and includes a circular shaft 216 having an enlarged portion or shank 218. An axial pin (not shown) within shank 218 and similar to that of FIG. 14 urges or pushes the cutting elements 219 outwardly or normal to the axis of the tool, similarly as shown in FIG. 14. Note that the cutting tool 215 of FIG. 16 includes a spring 220A formed as a ring which is inserted in a recess 221 formed in the periphery of shank 218. Spring 220A biases cutting elements 219 inwardly toward the axis of shaft 216 (see FIG. 10).

Importantly, the cutting tool 215 includes an adjustable positioning collar 223 mounted on shaft 216. Collar 223 has a set screw 224A for tightening the collar on shaft 216. Further, a flattened rectangular portion 225 of shaft 216 adjacent shank 218 is made flat to assure that set screw 224A may bear solidly against shaft 216. The flat portion 225 also extends inwardly of shank 218 and fits into a mating recess (not shown) in shank 218 to drive shank 218. A set screw 226A bears against flat portion 225 and prevents shaft 216 from pulling out of shank 218.

The adjustable collar 223 provides important advantages in that, first, it permits the major diameter of the tapered bore (see FIG. 8) to be readily adjusted and controlled. The diameter of the bore is selected by axial adjustment of collar 223 such that the tightness of the fit of the associated dowl and expansion element discussed hereinabove can be controlled by the collar 223. For example, if a very tight fit is desired, the collar 223 is adjusted away from shank 218 only a small distance; if an intermediate fit is desired, the collar 223 is adjusted further away from shank 218; and, if a loose fit is desired for purposes to be explained, the collar 223 is adjusted even further away from the end of shank 218. This permits the cutting tool 215 to be used for making a tapered bore into which a dowl and expansion element can be tightly inserted, as described hereinabove. In addition, the cutting tool 215 permits a controlled oversize diameter bore to be cut by cutting elements into which a dowl and an expansion element can be inserted, which holds the dowl but which permits it to rotate such as for use as an axle of a wheel of a wooden toy. In the latter case, the dowl is held tightly against axial movement, but is freely rotatable.

Collar 223 also permits the cutting edges 222A of cutting element 215 to be re-sharpened, resulting in slight variation in size; and, by adjustment of the collar 223, the size of the bore can be maintained at the desired size.

As can be appreciated, the embodiment of FIG. 16 allows an operator to produce a tapered bore with a single tool that is simple in construction; and the tapered bore is formed through a single movement of a driving tool, such as a conventional drill.

While the invention has been particularly shown and described with reference to a preferred embodiment thereof, it will be understood by those skilled in the art that various changes in form and details may be made therein without departing from the spirit and scope of the invention.

I claim:

1. A cutting tool for use in forming a circular bore extending from a surface of a workpiece and having an outwardly tapered portion adjacent a base of said bore comprising: a circular elongated member having a cutting edge at one end and a slot extending diametrically across said member at said one end, said member having an axial opening extending from an opposite end to said slot, first and second cutting elements pivotally supported at one end in said slot and having tapered outer cutting edges adjacent opposite ends, biasing means for biasing said cutting element into said slot and accomodating outward pivotal movement, means for pivoting said cutting elements radially of said slot to move the associated cutting edges beyond the periphery of said member, said means including a pin reciprocable in said opening and having a tapered end in said slot for engaging inner edges of said cutting elements, and adjustable retention means for releaseably retaining said pin in a first position and accomodating movement from said first position.

2. A cutting tool as defined in claim 1 in which said member has an axial opening extending from an opposite end to said slot and said means includes a pin reciprocable in said opening and having a tapered end in said slot for engaging inner edges of said cutting elements, further including adjustable retention means for releaseably retaining said pin in a first position and accomodating movement from said first position.

3. A cutting tool as defined in claim 1 in which said adjustable retention means includes a pair of cuts radially movable in diametrically opposite openings in said member, a spring-biased ball in each cut with said pin having detent recesses for receiving said balls.

4. A cutting tool as defined in claim 1, further including diametrically opposed abutment means spaced from said one end to define the depth of said bore.

5. A cutting tool as defined in claim 4 in which said member has an enlarged portion spaced from said one end and having diametrically opposed openings with said abutments including rods extending through said openings and releaseable means for maintaining said rods in adjusted positions.

6. A cutting tool as defined in claim 5 in which at least one of said abutment means includes a foot having a flat abutment surface and pivotally supported on said rod with retaining means for maintaining said foot in adjusted positions so that the angular orientation between said abutment surface and the axis of said member may be changed.

7. A cutting tool as defined in claim 1, further including adjustable friction-producing means between said pin and said member.

* * * * *